April 21, 1959 M. M. CREP 2,883,497
CURRENT CONTROL APPARATUS FOR TESTING BATTERIES OR THE LIKE
Filed Oct. 28, 1954 2 Sheets-Sheet 1
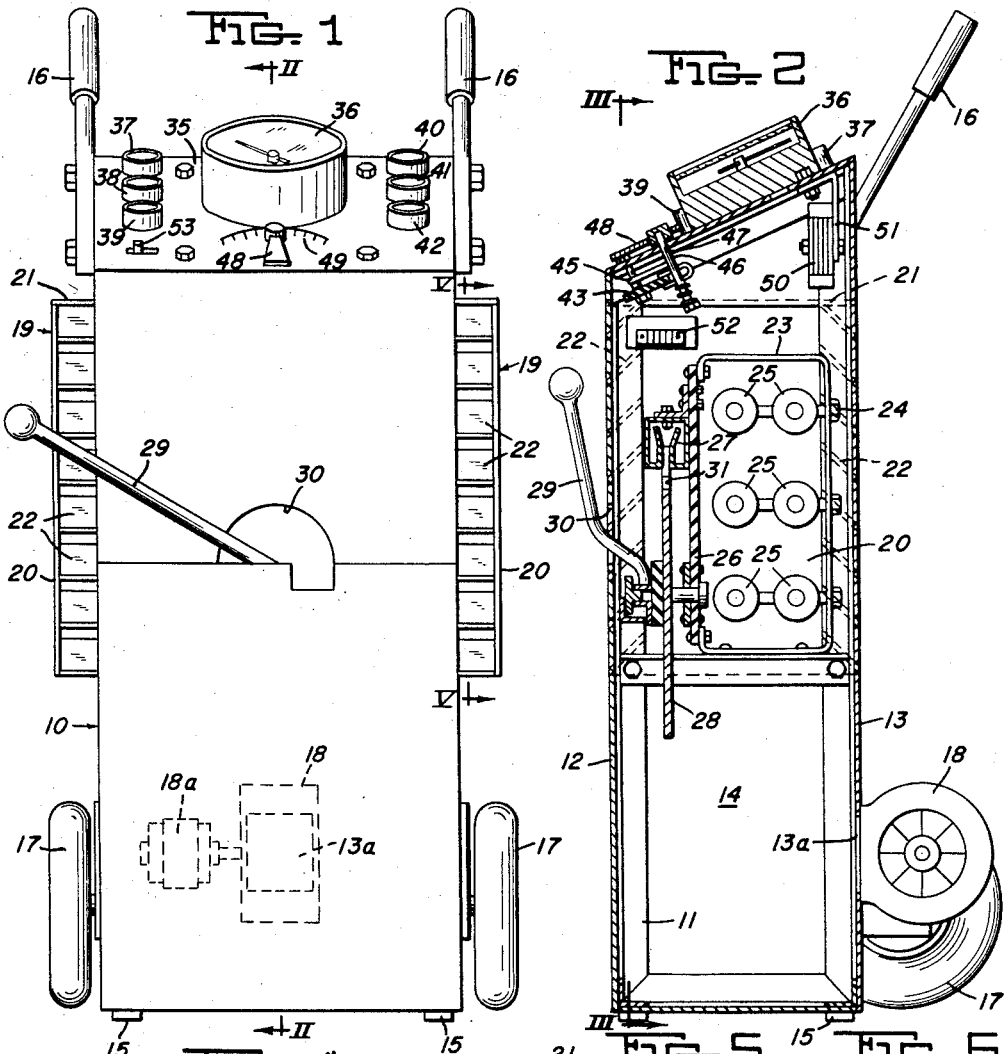
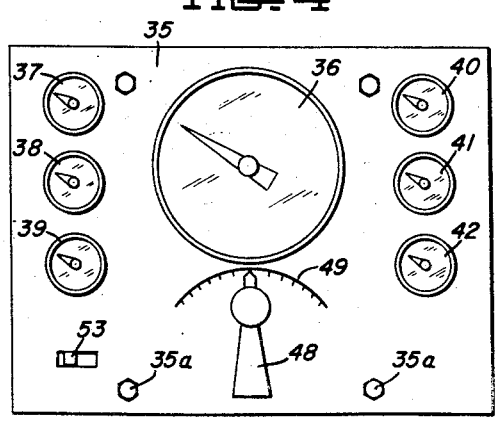
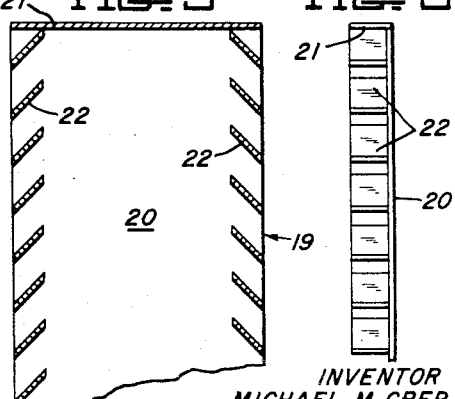
INVENTOR
MICHAEL M. CREP
By Donald G. Dalton
Attorney

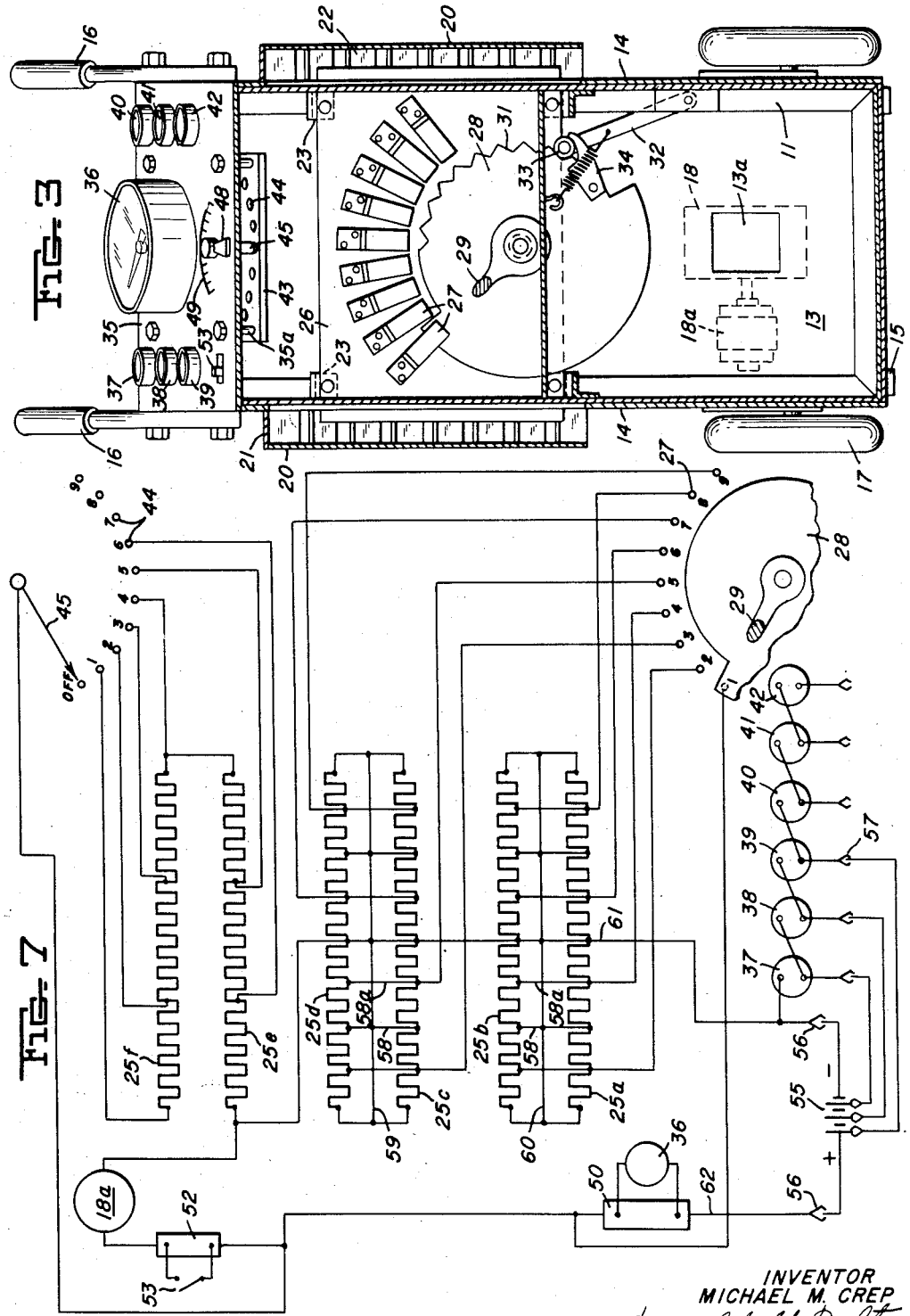

United States Patent Office 2,883,497
Patented Apr. 21, 1959

2,883,497

CURRENT CONTROL APPARATUS FOR TESTING BATTERIES OR THE LIKE

Michael M. Crep, Eveleth, Minn.

Application October 28, 1954, Serial No. 465,388

1 Claim. (Cl. 201—48)

This invention relates to apparatus for applying a predetermined load to a storage battery for the purpose of testing the capacity or condition thereof or for controlling a heavy-current load such as an arc-welding operation or a conductor-capacity test.

The object of the invention is to provide a testing or current-control apparatus applicable generally to batteries of various voltages and capacities for determining their ampere-hour capacity at a given discharge rate or making a periodic test of internal physical condition by noting the voltage drop after a short-time overload.

A further object is to provide a unitary or "package" tester which is compact, of relatively light weight and readily portable so it can be moved to the location of the battery to be tested.

A still further object is to provide a heavy-duty controller for regulating the output from a battery to a high-current load.

Another object is to provide a simple arrangement and circuit of load resistors for close current control and a motor-driven fan or blower for supplying cooling air thereto.

A complete understanding of the invention may be obtained from the following detailed description and explanation which refer to the accompanying drawings illustrating the present preferred embodiment. In the drawings:

Figure 1 is a front elevation of my invention;

Figure 2 is a transverse section therethrough taken along the plane of line II—II of Figure 1 showing parts in elevation;

Figure 3 is a sectional view taken along the plane of line III—III of Figure 2, with parts in elevation;

Figure 4 is a plan view of the control and indicating panel with parts omitted;

Figure 5 is a section taken along the plane of line V—V of Figure 1;

Figure 6 is an edge view of the louver box shown in Figure 5; and

Figure 7 is a circuit diagram.

Referring now in detail to the drawings, and for the present to Figures 1 to 4 particularly, the apparatus of my invention comprises a vertically elongated case 10 made up of an angle-iron frame 11 having front, back and side sheathing plates 12, 13 and 14, respectively, secured thereto. The case is provided with feet 15 at the bottom, rearwardly extending handles 16 at the top and a wheeled carriage 17 at the back whereby it may be moved as a hand truck from one location to another and then stood on its feet in erect position. A fan or blower 18 mounted on back plate 13 adjacent carriage 17 and driven by a motor 18a, delivers a stream of cooling air through an opening 13a to the lower portion of the interior of the case which constitutes a plenum chamber. As shown in Figure 3, side plates 14 extend upwardly only about halfway of the height of the case. Louver boxes 19, shown in detail in Figures 5 and 6, overlie the remaining portions of the sides of the case. Each louver box includes side and top walls 20 and 21 and louvers 22 normal to the side wall and spaced along opposite edges thereof. Thus the cooling air introduced by fan 18 into the plenum chamber flows upwardly through the case and out through the spaces between the louvers of boxes 19 at each side thereof. This permits the top of the case to serve as a control desk as later described.

Bent straps 23 mounted in the upper portion of frame 11 carry bolts 24 supporting a plurality of heavy-duty, tapped, spool-type, wire-wound resistors 25. A panel 26 of insulation is secured to the straps 23 and is provided with spring-finger contacts 27 of fuse-block type. A segmental wiper disc 28 journaled on the panel is adapted to enter between the fingers of the contacts and electrically connect together all the contacts it engages in successive positions at it is turned clockwise. A handle 29 secured to the disc but insulated therefrom projects outwardly through an opening 30 in the front plate 12. A portion of the periphery of disc 28 is of reduced diameter to clear contacts 27 and is provided with positioning notches 31. These notches cooperate with a yieldable spring-urged detent arm 32 pivoted to frame 11 and having a roller 33 of insulation engaging the notched edge of the disc. A dog 34 secured to the disc determines the zero position of the handle and disc on counterclockwise movement thereof. Four of the resistors 25, designated 25a through 25d are connected to contacts 27 as shown in Figure 7 to constitute with disc 28 a high-capacity controller for applying heavy-current loads to a battery for test or other purposes.

A sloping indicating and control desk 35 forms the top of case 10 and has an ammeter 36 and voltmeters 37 through 42 mounted thereon. A panel or block 43 of insulation carried beneath the panel 35 by bolts 35a has contact buttons 44 thereon adapted to be engaged successively by a contact finger 45. The finger is mounted on a shaft 46 journaled in the block normal thereto and extending upwardly through an opening 47 in panel 35. An actuating handle 48 is secured to the projecting upper end of the shaft. The remaining two resistors 25, designated 25e and 25f, are connected to buttons 44 as shown in Figure 7, to constitute a controller for applying a normal load to a battery to determine its ampere-hour capacity. A scale 49 on panel 35 and a pointer on shaft 46 cooperating therewith, indicate the position of finger 45.

A shunt 50 for ammeter 36 is mounted on a bracket 51 depending from frame 11 and a series resistor 52 for the fan motor is similarly mounted (see Figure 2). A switch 53 is mounted on panel 35 for shunting resistor 52 when desired.

For applying test or other loads to a battery, the various circuit elements described above are connected as shown in Figure 7. The battery is represented at 55. Spring clips 56 and flexible leads afford detachable connections therefor and a similar connection 57 is provided for each voltmeter, adapted to be secured to a terminal of each cell of the battery in order.

Resistors 25a and 25b, 25c and 25d are grouped in pairs, the resistors of each pair being interconnected by jumpers 58 and 58a. Jumpers 58 are connected to common conductors 59 and 60 both of which are connected to a negative bus 61. A positive bus is shown at 62. The remaining jumper connections 58a are extended to contacts 27 in succession. These connections cause the total resistance connected in series with the shunt 50 and battery 55 to decrease in regular steps as wiper disc 28 is advanced from the off position to engage successive contacts. Thus a gradually increasing current is drawn from the battery. The resistor circuit described is claimed in my copending application, Serial No. 625,159, filed November 29, 1956, which is a division hereof.

The remaining resistors 25e and 25f have taps connected to buttons 44 so that advancing the finger 45 connects in series with the shunt 50 and battery 55, a gradually decreasing resistance. Resistors 25e and 25f are such that they are adapted to carry a normal battery current practically indefinitely. Resistors 25a, 25b, 25c and 25d, however, are so constructed as to be able to carry an abnormal current by virtue of the plurality of parallel paths afforded. Resistors 25e and 25f are therefore used to make ampere-hour capacity tests while the remaining resistors are used to make tests of voltage drop on short-time overload or to control the heavy current required for welding or testing conductor capacity.

With the circuits as shown in Figure 7, if it is desired to make an ampere-hour capacity test, it is only necessary to advance finger 45 until ammeter 36 indicates rated current output and then measure the time during which the battery delivers the prescribed current. If it is desired to make a test of the internal condition of the battery either before or after charging, disc 28 is advanced until the prescribed overload current (150% of S.A.E. 20 min. discharge rate) is indicated on the ammeter and the drop in the voltage of individual cells after a predetermined time (30 sec.) is observed. It will be understood that individual cells or any group of cells may be tested in either way, as well as the battery as a whole.

For welding, the positive clip 56 is attached to the electrode, the positive terminal of the battery is connected to the work and disc 28 is advanced to cause the desired current flow when the electrode is brought in contact with the work. For testing the current capacity of a conductor, a length thereof is connected in the same manner as the welding load and disc 28 adjusted to give the proper current value.

Fan motor 18a is connected across the flexible leads connected to clips 56 and in series with a resistor 52. It is thus energized as long as the clips are in position on the battery terminals. For batteries of higher voltage, i.e., 18 volts or more, resistor 52 is left in circuit by opening switch 53. For batteries of lower voltage, switch 53 is closed. In either case the fan is driven to cool resistors 25 at all times when a battery is connected, regardless of the positions of disc 28 and finger 45.

Voltmeters 37 through 42 are connected in series so that one lead from each to the positive terminal of successive cells gives an indication of the individual voltages of the several cells.

It will be apparent that the invention is characterized by numerous advantages. It provides a compact, unitary, portable device of sufficient capacity to test heavy-duty batteries either over a prolonged period at normal load or by a short-time overload. It also facilitates control of heavy-current loads such as welding and conductor-capacity testing. The desired load may easily be applied by advancing either disc 28 or finger 45 until ammeter 36 indicates the proper current. The resistor connections and fan permit heavy current to be drawn and the energy thereof safely dissipated. No power source other than the battery being tested is needed for the fan motor. The device permits an indication of the condition of the battery plates and insulating separators to be obtained quickly without opening up the cells. The mobility of the apparatus permits it to be easily moved to the location of the battery to be tested.

The invention may be used for the discharge of batteries to be taken out of service temporarily, as well as the balancing of the state of charge of various cells showing different specific gravity of the electrolyte by partially discharging those cells having the higher reading.

Although I have disclosed herein the preferred embodiment of my invention, I intend to cover as well any change or modification therein which may be made without departing from the spirit and scope of the invention.

I claim:

A current controller comprising an elongated case adapted to stand upright, said case having front, back and side walls defining a plenum chamber in the lower portion thereof, said side walls extending upwardly from the lower end of the case and terminating at a point part way up the height of the case, a louver box offset outwardly from each side wall and extending upwardly from the upper edge thereof, a bank of resistors in the upper portion of said case, a sloping top on said case, a panel of insulating material spaced below said top, a plurality of contacts arranged in an arc on said panel and connected to said resistors, a moving contact member journaled in said panel adapted to engage said contacts, an opening in said top and a handle for operating said member extending through said opening.

References Cited in the file of this patent

UNITED STATES PATENTS

| Re. 13,739 | Yount | May 26, 1914 |
| 366,374 | Byllesby | July 12, 1887 |
| 556,408 | Fay | Mar. 17, 1896 |
| 614,394 | Kahlenberg | Nov. 15, 1897 |
| 758,303 | Eckmann | Apr. 26, 1904 |
| 1,472,914 | Kebler | Nov. 6, 1923 |
| 2,225,231 | Pugh | Dec. 17, 1940 |
| 2,453,462 | Sellers | Nov. 9, 1948 |
| 2,479,705 | True | Aug. 23, 1949 |
| 2,680,225 | Stevens | June 1, 1954 |